April 6, 1971 A. LATKIN 3,574,103
LAMINATED CELLULAR MATERIAL FORM
Filed Sept. 6, 1968 2 Sheets-Sheet 1

INVENTOR.
AARON LATKIN
BY
ATTORNEY

April 6, 1971          A. LATKIN          3,574,103
LAMINATED CELLULAR MATERIAL FORM
Filed Sept. 6, 1968          2 Sheets-Sheet 2
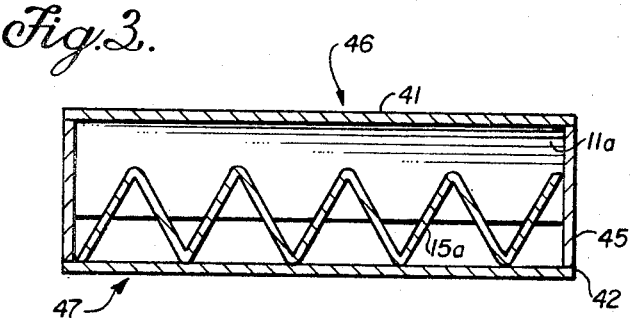
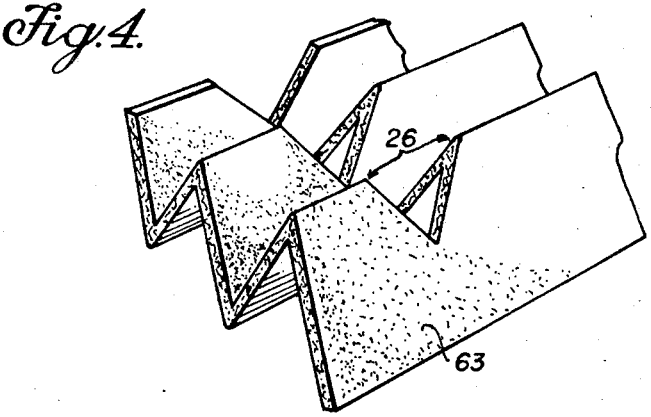
INVENTOR.
AARON LATKIN
BY
ATTORNEY

United States Patent Office 3,574,103
Patented Apr. 6, 1971

---

3,574,103
LAMINATED CELLULAR MATERIAL FORM
Aaron Latkin, Livermore, Calif., assignor to the United States of America as represented by the United States Atomic Energy Commission
Filed Sept. 6, 1968, Ser. No. 757,978
Int. Cl. B32b 3/28
U.S. Cl. 161—43          6 Claims

ABSTRACT OF THE DISCLOSURE

A cellular material form having a core formed of a plurality of corrugated laminar sheet elements, in which apices of corrugations on at least one side of a first sheet are notched transversely to receive and interlock with apices of the corrugations of a second sheet providing a plurality of interconnected or closed cells in a low density configuration which fitted together under compression is semi-rigid or is rigid and of high strength to weight ratio when appropriately bonded.

BACKGROUND OF THE INVENTION

This invention was conceived in the course of, or under, Contract W-7405-ENG-48 with the United States Atomic Energy Commission.

FIELD OF THE INVENTION

This invention pertains in general, to low density high strength material form or structures, and more particularly to a low density, high strength laminar material form or structure having a plurality of corrugated sheet elements in which apical portions on at least one side of one sheet are notched to receive apical portions of the corrugations of a second sheet oriented in transverse relation.

DESCRIPTION OF THE PRIOR ART

A variety of low density, rigid or semi-rigid material forms and structures are known in nature or have been produced artificially to be used for various purposes, for example, balsa wood or manufactured multicellular products such as honeycomb, bonded tubular or foam core materials. These may be employed as core materials in stressed skin structural fabrications, as packing to minimize shock damage, as energy-absorbing materials and for many other purposes. As may be noted, materials of the honeycomb category are generally bonded with adhesives and generally have significant rigidity only in the direction parallel to the cell walls. In an unbonded state, honeycomb arrangements generally lack dimensional stability and are easily disarranged. A significant need exists for rigid or semi-rigid low density, high strength cellular material forms having dimensional stability and various physical and structural properties differing from those presently available in the art.

SUMMARY OF THE INVENTION

The laminated cellular core material form of my invention is fabricated of a plurality of thin sheet or laminar elements provided with a series of generally parallel corrugations having corrugation apices generally extending outwardly to each side thereof. In one version corrugations on one side of the elements thereof extend with an uninterrupted substantially uniform apical height across the full dimension of the planar member, while the apex region of similar corrugations on the other side of the element are provided with indented or cutout notch portions spaced a distance corresponding to the spacing between said corrugations. Accordingly, on assembly the laminar elements are disposed in parallel abutment with the corrugations on alternate elements in transverse relation so that the uninterrupted apex region of corrugations on one element are seated and mate with the indentations in the apical corrugation region of the abutting element forming a semi-rigid or rigidly interlocked material form when placed under compression, even in the absence of a bonding agent disposed at contiguous surfaces. In a second version, corrugation apices may be notched at alternately staggered positions on each side of one element and the core constructed by interleaving an unnotched corrugated laminar element between two notched elements. With either unbonded construction, which is suitable for many purposes, the effort of applying adhesive and disadvantages stemming therefrom are eliminated. For other applications, requiring a high rigidity and strength, etc., adhesives such as setting resins, contact cement, or metallic bonding agents as appropriate may be employed to bond the corrugated sheet elements at points of intersection yielding a core body or form having three-dimensional rigidity. Cover panel elements having matching corrugations or indented corrugations and/or planar side panels may be applied to such a core form to yield high-strength-to-weight ratio box, beam or panel structures.

Spacing between laminar elements may be varied over wide ranges. For example, with thin foils, spacing can be made as small as desired, e.g., even to a limit wherein the cellular interstices of the matrix defined by the corrugations of the elements approximate minute foam bubbles. Thus, the invention provides a cellular material form in which the interstitial spaces may range from a minute closed cellular nature to a form in which larger interstitial spaces are interconnected in at least the laminar direction, and even to a form in which the interstitial spaces define sinuous channels from side to side of the core. The inherent high strength-to-weight ratio of the material form when bonded makes it an ideal structural material. In the aerospace industry, in particular, low density high strength properties are often crucial in constructing airframes and auxiliary equipment. Since the density of the present material form may be varied, it is especially suited for structural applications such as in airframes. The material form is also suitable for insulation and many other purposes analogous to those noted hereinbefore as well as others for which cellular low density forms have heretofore been employed.

The unbonded form can be used, per se, under compression as packing or support, while the bonded forms may also be for other purposes such as high strength-to-weight ratio structural members, heat exchanger cores, with exchange media flowing in interconnected alternate inter-panel cellular spaces, or for other purposes such as in nuclear reactor cores or the like, in which it is desired to provide specified mass/unit volume of fissile and fertile materials, moderators, poisons, etc.

Accordingly, it is an object of this invention to provide a novel low density, multi-ply, interlocking, corrugated laminar material cellular form.

A further object of this invention is to provide a low density cellular material form including a plurality of interlocking self-supporting corrugated laminar elements.

Various other features and objects of the invention will be apparent in the following description and the accompanying drawings, of which:

FIG. 3 is a side view of a modification of the embodiment of FIG. 1; and

FIG. 4 is an enlarged perspective view of a particular laminar member portion of the embodiments of FIGS. 1 and 3.

DESCRIPTION OF THE PREFERRED EMBODIMENTS

Figure 1:
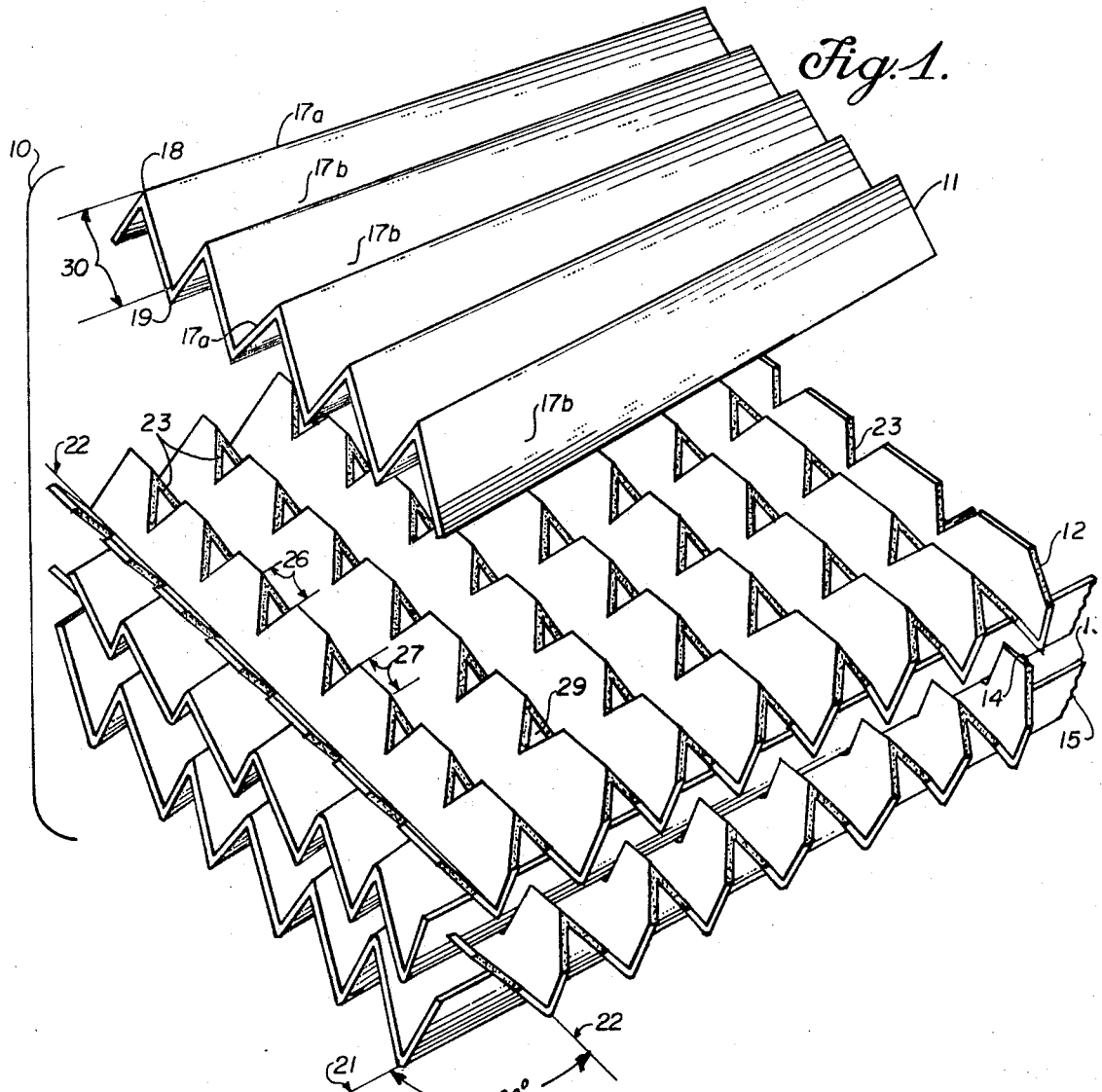
FIG. 1 is a perspective view of a preferred embodiment of the material form of the invention.

The cellular material form of my invention, is generally constructed of a plurality of laminar elements; for example, laminar elements 11 through 15 comprising structure 10 in FIG. 1 of the drawing. Elements 11 through 15 may be formed of sheet or film material folded or otherwise deformed using conventional folding, rolling or stamping equipment to provide a series of generally parallel pleat-like V-shaped corrugations thereon. More particularly, in the form shown in FIGS. 1, 3 and 4, with particular reference to topmost element 11, the sheet or film material is deformed to provide a series of straight corrugations having planar sides 17a, 17b, and sharp apical ridges 18 and 19, at the juncture of said sides, and projecting alternately upward and downward from a midplane of symmetry of said element, somewhat in the manner of accordion pleats. The other members are of similar form. However, with a wider spacing between corrugations and with a similar pitch of said planar sides a horizontal planar midplane sheet portion (not shown) would separate adjacent corrugations at said midplane. Uppermost element 11 in which the apices of said corrugations are not notched may serve as top and bottom panels or cover sheets, respectively, for some purposes, e.g., as for packing, structural beams or panels. However, for providing panels or box structures, other panel or cover sheets may also be provided as disclosed below. Lowermost element 15 may be similar to element 11 and may also be provided with corrugations only on the side abutting against inner elements. It is not essential that ridge heights from the horizontal planar sheet portion be the same on each side of said elements although the bisymmetrical arrangement, described above, facilitates construction. The ends of the elements may be square cut or beveled as illustratively shown in the drawings.

To provide for the interlocking feature of the invention inner elements 12 through 14, which taken together may be considered to be the core of structure 10, in FIG. 1, differ from topmost and lowermost elements 11 and 15 in that, the uppermost apical ridge portions 18 of each element 11 through 14 are provided with aligned transverse V-notches or indentations 23. The V-notches or indentations are provided with a configuration suitable to receive the lower apices 19 of an adjacent element in close fitting transverse seating relation. Accordingly, apical portions, e.g., portions 19 of element 12, may be disposed with the edges of said notches resting firmly against planar sides 17a, 17b, of said corrugations. The V-notches should have a minimum depth of at least about one-tenth of the corrugation height to afford proper seating and effective supportive interlocking. At the other extreme, the V-notches may approximate the ridge height having only a thin apical ridge portion affording continuity of the corrugation. Usually the V-notch depth, for structural purposes, may lie in the range of about 25% to 75% of the corrugation height.

An alternative arrangement (not shown) can be provided by notching the corrugations of alternate sheet at staggered locations on both sides of the element and interleaving un-notched elements such as element 11 therebetween. This construction has the advantage that leak proof continuous laminar elements define, channeled passages therebetween. The notches or indentations can be provided, e.g., by diamond shaped perforations punched in the sheet material and then the sheet is folded to bisect the perforation with the apical ridge portion to provide the corrugations, by folding and cutting out V-notches in the folded sheet, by molding appropriate perforations into the sheet, or the like.

It is apparent that the spacing of respective corrugations will determine the spacing of such ridge apertures. Closely spaced corrugations imply a correspondingly large number of such notched apertures per unit ridge length. Where high material densities are desired, close spacing with steeply pitched corrugations is therefore indicated, while the converse is true where lower density and more easily deformable forms are desired. It will be apparent that a relatively large energy expenditure would be required in crushing such a structure, which property is of advantage, e.g., in a crushable cushioning member.

The laminar members are assembled with the corrugations of alternate members in intersecting angular relation, for example, as related to the corrugation longitudinal dimensional orientation arrows 21, 22, respectively. While the angular relation may be varied considerably, e.g., as in a diagonal orientation, to provide anisotropic properties, the orientation of intersecting corrugations is preferably at 90°, yielding isotropic properties at least parallel to the laminar member, i.e., in the edgewise directions. Likewise, the corrugations may be made sharp or obtuse with an included angle in the range of about 10° to about 170° and in widely varied height and spacings, providing for a corresponding variation of physical properties in the various dimensions, density of matter per unit volume, and in the proportion and configuration of void space in the structure.

Sheet, film or plate materials used in providing said elements may range in thickness from as thin as about 0.001 inch to as thick as can be formed or built up. Materials such as those employed in structural honeycomb fabrication are generally suitable. Rigidity and other structural properties may be varied by appropriate spacing of corrugations and choice of the materials constituting the elements. Also, mutual support between laminar members is strongly influenced by the shape and depth of the ridge-apertures. In typical applications, with very thin foils, spacings of 0.005 to 0.010 inch may be used. For typical honeycomb materials spacings can be made to correspond generally to typical honeycomb cell dimensions, e.g., ⅛ to 1 inch.

A typical configuration is illustrated in which the width of the mouth 26 of ridge-apertures 23, may be approximately equal to the ridge spacing 27 between adjacent apertures, and the depth 29 of a ridge-aperture 23 may be approximately one-half the distance 30 between ridges 18 and 19 of member 11. For increased mutual supporting strength for successive members, the depth of ridge-apertures should be increased; for lower density and decreased support, the depth should be decreased. This variable density feature of the invention, also inherent in the foregoing consideration, may be used to advantage. Such V-notch ridge apertures may obviously be provided by means of perforating equipment prior to corrugation or subsequently by means of perforating equipment or by means of mechanical cutting equipment as noted above.

Once laminar members 11, 12, 13, etc., are arranged as shown in FIG. 1, compression may be applied normal to the laminar elements by whatever means to hold the members together. Also, as illustrated in FIG. 3, wherein only two laminar elements 11a, 15a, corresponding to elements 11, 15, arranged as a core are shown for simplicity, planar cover sheets 41, 42, may be placed in abutment above and below with the elements 11a, 15a, to act as a load bearing or panel surface. A box frame structure 45 may loosely encompass the sides of core elements 11a, 15a. The compressive forces indicated by arrows 46 and 47 may be applied as in a load bearing arrangement or all of the elements may be bonded to form a rigid panel or pad structure. Compression alone can securely hold the apical portions of a respective laminar member in the mating array of ridge-apertures, thereby supporting unbonded multiple-plies of similarly arranged laminar members. For other purposes, contact adhesives, solder, braze, setting adhesives, welding, and other bonding agents may be applied to abutting intersecting surfaces to form a rigid, low density structural member. Furthermore, the entire structure can be impregnated to increase rigidity and effect bonding. However, for minimum weight only the edges of the grooves and other abutting sections need be treated with the bonding agent.

was impregnated with a typical fluidic epoxy resin including 22 parts by weight of methane diamine curing agent to 100 parts of resin and cured at 120° F. to form a bonded structure similar to that of FIG. 1. These structures having the dimensions and other parameters set forth in the following table were subjected to physical testing yielding the results set forth in said table.

TABLE

| Part No. | Material | Thickness | Cell size | Test direction | Density, gm./cc. | Density, lb./ft.$^3$ | Crush strength, p.s.i. | Modulus p.s.i. | Resin percent by wt. impreg. |
|---|---|---|---|---|---|---|---|---|---|
| 1.1 | Cotton linters 80# | .009 | ½×.47 | = | .11 | 6.8 | 210 | 14,500 | 56 |
| 1.2 | do | .009 | ½×.47 | ⊥ | .11 | 6.8 | 143 | 11,300 | 56 |
| 2.1 | Cotton linters 30# | .0035 | .25×.241 | = | .068 | 4.25 | 63.4 | 6,600 | 40 |
| 2.2 | do | .0035 | .25×.241 | ⊥ | .068 | [4.25 | 16 | 1,630 | 40 |
| 3 | do | .0035 | .375×.335 | ⊥ | .046 | 2.9 | 14.5 | 520 | 42 |
| 4 | do | .0035 | .375×.335 | = | .046 | 2.9 | 29 | 5,200 | 42 |
| 5.1 | Cotton linters 40# | .0045 | .375×.335 | (¹) | .0675 | 4.2 | | | 57 |
| 5.2 | do | .0045 | .375×.335 | (¹) | .0675 | 4.2 | | | 57 |
| 6.1 | do | .0045 | .375×.335 | ⊥ | .0614 | 3.8 | 20 | 5,300 | 51 |
| 6.2 | do | .0045 | .375×.335 | ⊥ | .0614 | [3.8 | 22.5 | 4,000 | 51 |
| 6.3 | do | .0045 | .375×.335 | = | .0614 | 3.8 | 51.5 | 9,800 | 51 |
| 6.4 | do | .0045 | 375×.335 | = | .0614 | 3.8 | 57 | 9,500 | 51 |

¹Not tested.

Figure 2:
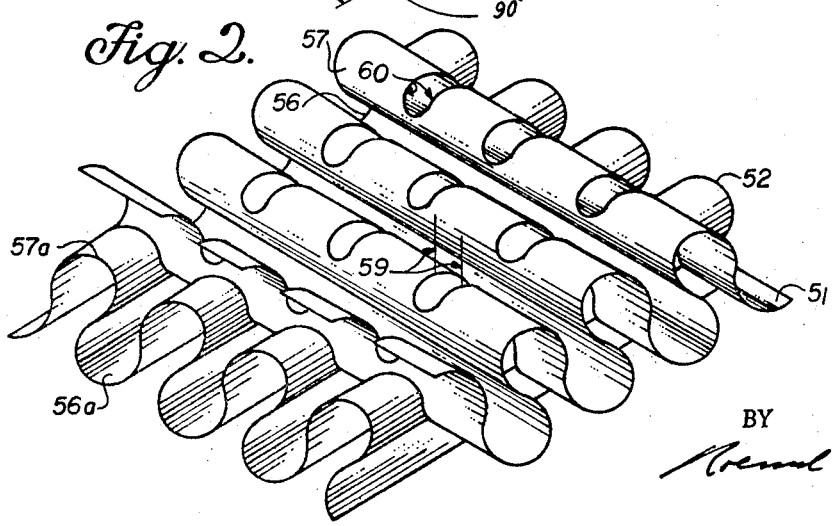
FIG. 2 is a perspective view of a second preferred embodiment.

In the second embodiment of the material form of the invention illustrated in FIG. 2, a plurality of laminar members, i.e., represented by two members 51, 52, for simplicity are provided with parallel, rounded, arcuate corrugations of similar disposition to those foregoing. In such second embodiment, however, arcuate lobular portions 56 and 57 project downwardly and upwardly from the midplane of such members, respectively. The upwardly projecting corrugation lobes 57 are provided with transverse notch apertures 58 having a curved configuration matching the cross section of a corresponding corrugation. A self-locking configuration is provided when somewhat more than a 50% overlap exists in the intersecting region. The mouth portion 59 of such a notch is then of a narrower dimension as compared with receptacle portion 60 of such apertures 58. Accordingly, with thin resilient material, the lower lobular portions 56 of upper member 51 can then be compressed slightly and inserted into the apertures 58' of lower member 52 and released to spring outwardly to seat firmly in such aperture 58'. With a lower degree of curvature of such corrugations, e.g., semi-circular arcuate, or semi-circular notch apertures may be utilized, providing a structure similar to that of FIG. 1, with rounded corrugations and apertures replacing the V-notched corresponding portions. Other corrugation or notch configurations, e.g., of trapezoidal of polyhedral, cross section, could also be used.

It will be appreciated that somewhat more resiliency can be obtained with the second embodiment as compared to the first. As with the first embodiment, bonding materials or bonding techniques can be used to rigidly unite the members and paneling or other surface cladding (not shown) can be also used therewith to produce an integral and dimensionally rigid structure. While natural resiliency of the material may be relied upon to allow corrugation portions to be collapsed and inserted to spring into close fit in the aperture as described, the ridge-apertures 58 may also be made momentarily large enough to accommodate the enlarged lobular portion by springing the sheet to open the ridge aperture mouth. Also, after the corrugation is seated, tension can be applied orthogonal to the plane of members 51, 52, etc., causing lateral expansion of the corrugation, thus creating the interlock mentioned above.

The following example illustrates a single application for the material form described above.

EXAMPLE

A variety of assemblies of notched corrugation laminar elements were made from cotton linter structural fabrication paper of the type used in conventional honeycomb fabrication. The assembly of cotton linter paper laminar members including additional stiff aluminum cover sheets It is to be understood that my invention relates to multi-ply, cross-corrugated material having a diversity of structural and non-structural uses. By combining members 11, 13, 12, 14, made of materials with different properties, advantageous properties of both materials may be obtained in a composite structure. For many purposes analogous to honeycomb material, plain and impregnated cellulosic materials such as paper, metallic sheets and film such as aluminum, titanium, beryllium, etc., as well as impregnated fibrous and sheet plastic in thicknesses of above 0.001 inch can be used.

Composite structures for special purposes can also be easily produced. For example, for neutron shielding, it is well known that boron nucleii readily combine with low energy neutrons in the reaction $(B^{10} > n) \rightarrow Li^7$. Boron carbide and elemental boron has been produced as a filament which may be woven like a fabric. Such fabric is impregnated with a stiffening agent such as a thermosetting resin and is molded to from a notched corrugated sheet material 63 as shown in FIG. IV and may be arranged similar to elements 12–15 of FIG. 1. The boron then can act as a neutron absorber in which function the resin, if of low atomic number, e.g., contains hydrogen, deuterium, etc., assists by serving as a moderator. Likewise laminar elements of moderating and absorbing elements can be interleaved.

A neutron absorber is generally incorporated in fission reactors for safety purposes or to protect instrumentation. Slow neutrons are captured by nucleii of common structure, which become excited after neutron capture and emit gamma rays. To prevent the appearance of unwanted gamma rays, boron composition or other neutron absorber materials are disposed in stragetic locations, forming shielding. The present structure can be used to provide shielding and low density structural support at peripheral regions of a reactor. These combined properties are especially useful in aerospace application, i.e., space power reactors.

While there has been set forth in the foregoing what may be considered to be preferred emodiments, modifications may be made therein without departing from the teachings of the invention and it is intended to cover all such as fall within the scope of the appended claims.

I claim:
1. A high strength low density structural material form including a core comprising:
   at least first and second laminar sheet elements having successive parallel accordion pleat-like V-shaped corrugations formed therein with apical ridges of said corrugations extending alternately to either side of a midplane of symmetry of said element, the planar sides of said corrugations including an angle in the range of about 10° to about 170° therebetween, said corrugations of said first element defining V-notch apertures in the apical portions on at least one side thereof, siad V-notches having a depth in the range of about 25% to 75% of the corrugation height with the V-notches of successive corrugations being aligned, said second laminar element being disposed in stacked relation to the first with the corrugations thereof extending transversely to the corrugations of the first element and with apical ridge portions of said V-shaped corrugations on one side thereof being seated in close-fitting relation in said V-notch apertures of the corrugations of the first laminar element; and a bonding agent disposed to unite touching intersecting regions of said laminar elements to provide a rigid, low-density, high strength structure.

2. A structural material form as defined in claim 1 wherein said corrugations on the second side of said first laminar sheet element are also provided with said aligned V-notches, however, at a location intermediate of the V-notches on the first side thereof, and wherein said core comprises a plurality of at least three of said first and second laminar sheet elements arranged in said stacked relation and united by means of said bonding agent.

3. A structural material form as defined in claim 2 wherein width of the mouth of said V-notches is approximately equal to the ridge spacing between adjacent notches and the depth thereof is approximately one-half of the distance between corrugation apices on opposite sides of said laminar element.

4. A structural material formed as defined in claim 1 further including planar sheet cover elements disposed in bonded abutting relation with the ridges of the corrugations projecting from the exterior surface of the two outermost corrugated laminar elements of said core.

5. A material form as defined in claim 4 wherein there is included a frame of sheet material enclosing and bonded to the edges of said core and to said cover elements and together with said planar sheet cover elements defining a box enclosure for said core.

6. A structural material form as defined in claim 1 wherein said corrugations comprise arcuate lobular portions, wherein said notches are of an arcuate lobular configuration and have a depth exceeding 50% of the height of said corrugations and with a mouth width less than the width of such corrugations so that said notches engage the corrugations seated therein in an interlocked mating configuration.

References Cited
UNITED STATES PATENTS

| | | | |
|---|---|---|---|
| 1,875,188 | 8/1932 | Williams | 161—134X |
| 3,041,223 | 6/1962 | Sage | 161—134X |
| 3,044,586 | 7/1962 | Cassels | 52—668 |
| 3,070,480 | 12/1962 | Breiner | 161—127X |
| 3,391,513 | 7/1968 | Jones | 52—668X |
| 3,438,167 | 4/1969 | Royston | 52—668X |

JOHN T. GOOLKASIAN, Primary Examiner

J. C. GIL, Assistant Examiner

U.S. Cl. X.R.

52—618, 625, 674; 161—68, 134, 55, 111